US007431540B2

(12) United States Patent
Löf et al.

(10) Patent No.: US 7,431,540 B2
(45) Date of Patent: Oct. 7, 2008

(54) TURNING INSERT

(75) Inventors: Ronnie Löf, Sandviken (SE); Hans Thordenberg, Gävle (SE); Chris Mills, Sandviken (SE); Jörgen Wiman, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/127,141

(22) Filed: May 12, 2005

(65) Prior Publication Data

US 2006/0039763 A1 Feb. 23, 2006

(30) Foreign Application Priority Data

May 14, 2004 (SE) .................................... 0401245

(51) Int. Cl.
*B23B 27/16* (2006.01)

(52) U.S. Cl. ........................ 407/113; 407/103; 407/114

(58) Field of Classification Search ......... 407/113–115, 407/103, 107
See application file for complete search history.

(56) References Cited

U.S. PATENT DOCUMENTS 4,681,488 A * 7/1987 Markusson ................. 407/114
4,990,036 A * 2/1991 Eklund et al. ............... 407/113
5,226,761 A 7/1993 Satran et al.
5,256,008 A * 10/1993 Hansson et al. ............... 407/33
5,486,073 A * 1/1996 Satran et al. ................ 407/113
5,593,255 A * 1/1997 Satran et al. ................ 407/113
5,634,745 A * 6/1997 Wiman et al. ............... 407/113
6,079,912 A * 6/2000 Rothballer .................. 407/114
6,612,786 B1 9/2003 Kanada et al.
2002/0061235 A1* 5/2002 Maier ......................... 407/113
2004/0146365 A1* 7/2004 Usui et al. .................. 407/113
2005/0249559 A1* 11/2005 Lof et al. .................... 407/113

FOREIGN PATENT DOCUMENTS

EP 1 475 171 11/2004
JP 62208817 A * 9/1987

* cited by examiner

*Primary Examiner*—Boyer D. Ashley
*Assistant Examiner*—Sara Addisu
(74) *Attorney, Agent, or Firm*—Drinker Biddle & Reath LLP

(57) ABSTRACT

A turning insert includes a chip-breaking surface and first and second clearance surfaces located at a corner of the insert. First and second edges are formed at a junction of the chip-breaking surface and the first and second clearance surfaces, respectively. The first edge defines a major cutting edge, and the second edge defines a finishing cutting edge. The major cutting edge is straight and transforms into the second edge by a sharp transition.

14 Claims, 5 Drawing Sheets

L 17
L6
L4
5
4
17
6
15
B
7.
5a
16
β
Ba
16
5a
$β_1$
α
15
$α_1$
15
ε
λ
γ
6
4
17
5

7
13.
11.
10.
11.
13.
14
14
22
12
19
12
8

TURNING INSERT

The present application claims priority under 35 U.S.C. § 119 to patent application Serial No. 0401245-6 filed in Sweden on May 14, 2004.

TECHNICAL FIELD OF THE INVENTION

This invention relates to a turning insert of the type that comprises at least one corner having two edges formed between a chip-breaking surface and clearance surfaces, wherein a first of the edges is for chip removing and a second is for surface finishing.

BACKGROUND OF THE INVENTION

Recently acquired knowledge, which forms the basis of this invention, has shown that chips which are curved as viewed in cross section and which are generated by entirely or partly round edges, require a greater energy consumption to be cut and generate greater heat release than chips which are straight as viewed in cross section and which are generated by straight edges. More precisely, it has been shown that the released chip in each point along the width thereof aims to move perpendicularly to each infinitesimal section or point along the edge. This means that a straight cutting edge generates a cross section-wise straight chip, which in its entirety is directed perpendicularly to the edge, and which gives rise to the smallest possible heat release, while an entirely or partly round edge generates an entirely or partly curved chip, which causes a greater heat release. Generally, high temperatures wear the cutting insert more than lower temperatures. More precisely, the hot chip gives rise to so-called crater wear, i.e., in the area where the chip impinges on the top side or chip-breaking surface of the cutting insert, initially a crater arises, the dimension and depth of which grows in the course of time. Since it is previously also known that the setting angle (i.e., the angle of the cutting edge to the feeding direction of a turning tool) of the chip removing edge influences the wear of the cutting insert, more precisely in such a way that small setting angles give less general wear than greater setting angles.

DESCRIPTION OF THE PRIOR ART

For turning purposes, round cutting inserts are used to a certain extent, but above all cutting inserts of polygonal, e.g., square or rhombic basic shape are used. The polygonal cutting inserts include one or more chip removing major cutting edges, which are straight and transform into a surface-finishing edge of generally round shape. When the cutting insert has a distinct nose of a considerable radius, or when the surface-finishing edge, e.g., on a square cutting insert, only consists of a rounded corner portion between two straight major cutting edges, the surface finishing is effected (after the chip has been removed by the major cutting edge) only along a substantially infinitesimal portion of the round edge; i.e., at the tangential point of the round edge located closest to the geometrical rotation axis of the rotary workpiece. Particularly in the last-mentioned case, i.e., cutting inserts having comparatively small, surface finishing corner edges, the major part of the chip (provided that the cutting depth is great and the setting angle is conventional, i.e., 45°) will obtain a cross section-wise straight shape, however, with the exception of the edge of the chip that is formed closest to the surface finishing tangential point of the corner edge. In small cutting depths of the type that are characteristic of machining of hard materials, the part of the chip being curved is, however, increased in proportion to the decrease of the cutting depth.

Turning inserts of the above generally described type are previously known by, among other patents, U.S. Pat. No. 5,226,761 and U.S. Pat. No. 6,612,786.

With the purpose of improving previously known turning inserts, in particular in respect of increased service life by reduced crater or corner wear, but also with the purpose of reducing the amount of remaining material in the fillet after finalized machining, a cutting insert has been developed, which is the subject of the Swedish (non-published) patent application SE-0301323-2 (corresponding to EP 1 475 171). However, also this cutting insert has the imperfection that the individual corner adjacent to the chip removing major cutting edge is of a generally round shape, more precisely by being made in so-called wiper technology, i.e., the transition between the individual major cutting edge and a clearance edge consists of two or more circular segments of different radii of curvature. In other words, also in this case the removed chip in the immediate vicinity of the surface finishing edge segment gets a curved shape, which gives elevated heat release and thereby crater wear in the immediate vicinity of the surface finishing edge segment. While the edge of the chip that is distanced from the surface finishing edge segment gets full thickness, the opposite edge will not only obtain curved shape, but also a successively reduced thickness, which results in the outermost edge portion, which is generated in the immediate vicinity of the surface finishing edge segment, becoming saw tooth-shaped. Such saw tooth-formations in said chip edge are detrimental in several respects, among other things, by contributing to the wear of the cutting insert, and making the chips additionally sharp and scratchy (involving that the chips may damage the surrounding surface regions in connection with the after-treatment).

OBJECTS OF THE INVENTION

The present invention aims at obviating the imperfections of the turning insert according to SE 0301323-2 (EP 1 475 171) and at providing an improved turning insert. Therefore, a primary object of the invention is to provide a cutting insert particularly intended for the machining of hard materials, which insert can generate a chip that is substantially straight along the entire width thereof, and which, therefore, requires minimal energy consumption and thereby gives minimal heat release, more precisely with the utmost purpose of increasing the service life of the cutting insert. An additional object is to provide a cutting insert, the possible wear of which takes place at as great a distance as possible from the surface finishing edge in order to guarantee high performance over time in respect of the smoothness of the machined surface.

SUMMARY OF THE INVENTION

The invention is based on the idea to make the chip removing edge or the major cutting edge straight along the entire length thereof, and to form the transition into a connecting, surface-finishing edge in the form of a sharp transition. Preferably, also the surface-finishing edge is straight, at least adjacent to the sharp transition. In cutting inserts which are ground, the sharp transition or the sharp corner is provided by the fact that the clearance surfaces adjacent to the respective edges are ground in planes extending at an obtuse angle to each other (involving that the transition between the two clearance surfaces will consist of a straight, sharp interruption line). Alternatively, in direct-pressed cutting inserts, it is ensured that the two surfaces in the mould that should define the two clearance surfaces converge into a straight or linear corner.

BRIEF DESCRIPTION OF THE APPENDED DRAWINGS

The objects and advantages of the invention will become apparent from the following detailed description of a preferred embodiment thereof in connection with the accompanying drawing in which like numerals designate like elements, and in which FIG. 1 is a schematic view showing a cutting insert according to the invention applied in a turning tool, as well as a rotary workpiece during machining.

DETAILED DESCRIPTION OF A PREFERRED EMBODIMENT

Figure 1:
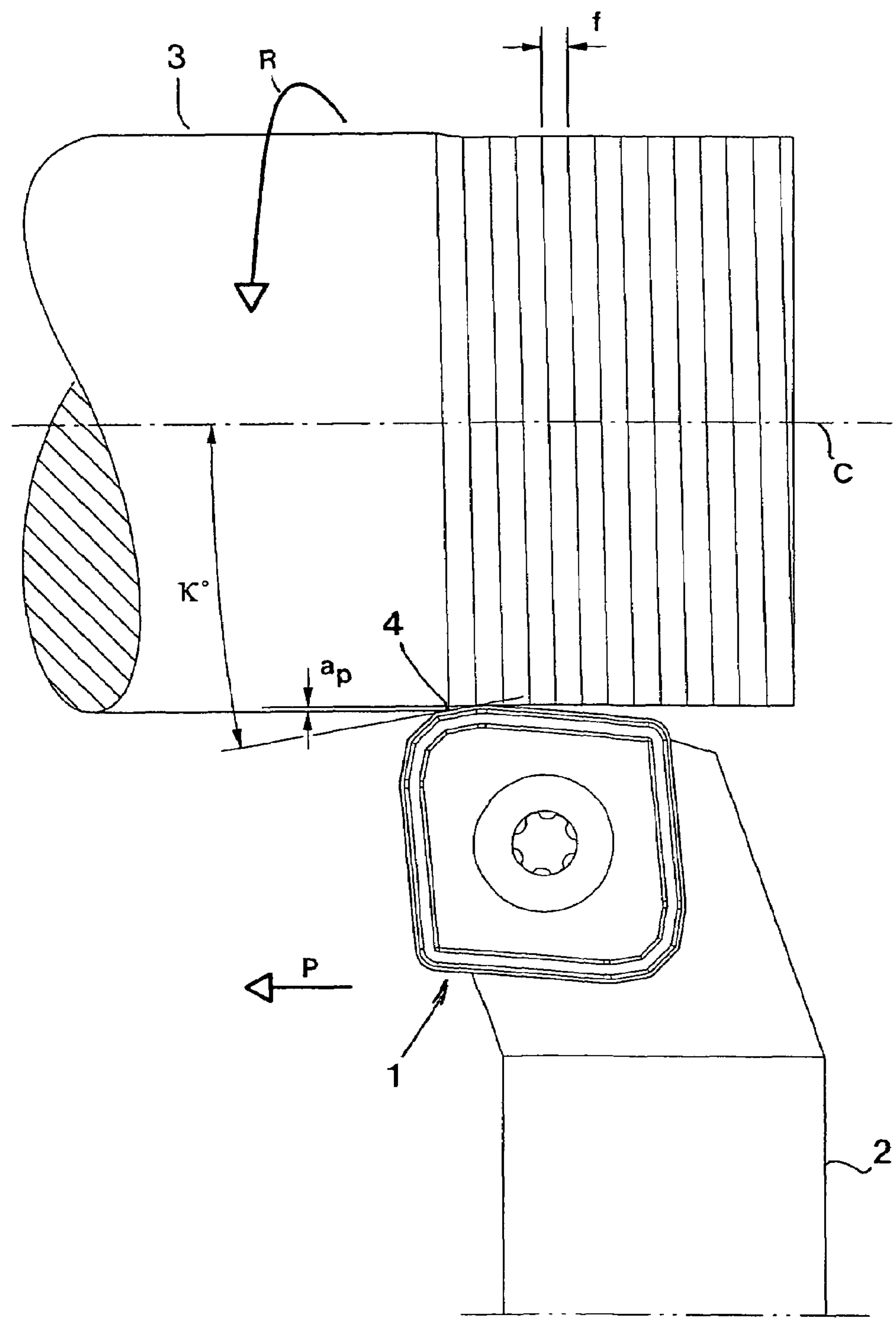

In FIG. 1, 1 generally designates a cutting insert made in accordance with the invention, which insert, together with a bar or a shank 2, forms a turning tool. A workpiece designated 3, e.g., a shaft or the like, is rotatable around a center axis C, more precisely in the direction of the arrow R. Most commonly, the workpiece is clamped in rotatable chucks, while the tool is movable along the workpiece, e.g., parallel to the center axis C. The relative feeding direction between the tool and the workpiece is indicated by the arrow P. In the cutting insert, a chip removing, active major cutting edge 4 is included, the angle of which to the feeding direction P (which, per se, could form an angle to the geometrical center axis C) constitutes the so-called setting angle $\kappa°$ of the edge. The feeding of the tool is designated f, while the cutting depth is designated $a_p$.

Figure 2:
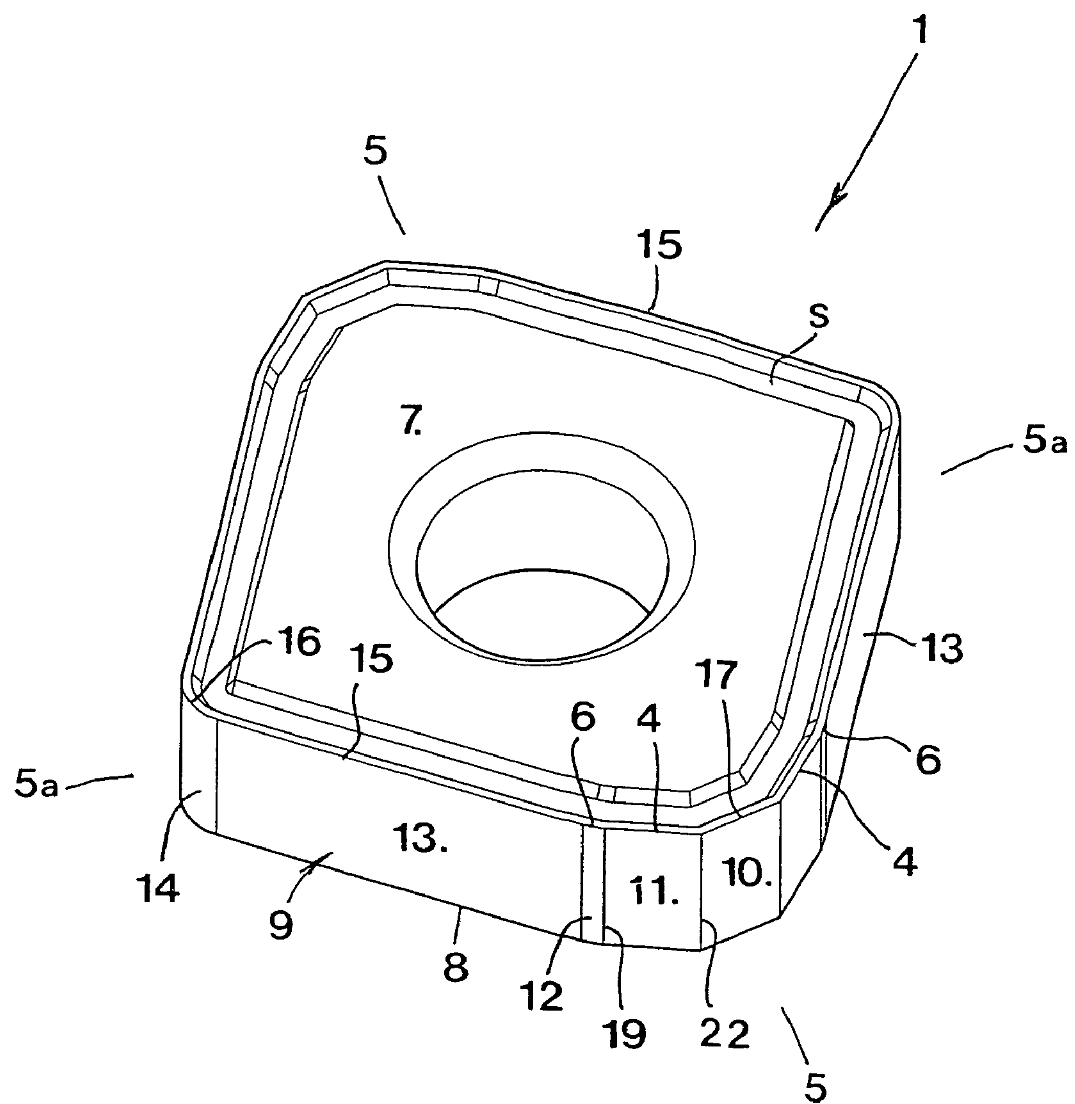
FIG. 2 is an enlarged, schematic perspective view showing the cutting insert according to the invention.

Reference is now made to FIG. 2, which in perspective shows the design of the cutting insert. Although the invention is applicable also to cutting inserts having only one single major cutting edge together with a co-operating, surface finishing edge, the same is exemplified in connection with a cutting insert that, at two diametrically opposed corners 5, has pairs of identical major cutting edges 4 together with surface finishing edges 6. In other words, the cutting insert according to the example includes in total four major cutting edges 4. Generally, the cutting insert is of a polygonal, prismatic basic shape, and comprises a top side 7 that is parallel to a bottom side 8. Between the top and bottom side, a circumferential side surface extends, which is generally designated 9. In this circumferential side surface, a number of part surfaces are included and designated 10, 11, 12, 13 and 14, the part surfaces 11 and 12 of which form clearance surfaces adjacent to the edges 4, 6. In the usual way, the edges 4, 6 consist of edges between the top side of the cutting insert and the clearance surfaces.

In the example, the top side 7, which constitutes the chip-breaking part of the cutting insert, is only schematically shown. In other words, the top side of the cutting insert is not shown as forming a completed cutting-geometry surface. However, adjacent to the periphery of the surface, a flute-like depression S is illustrated, intended to serve as chip breaker. In other words, in practice the cutting insert should include means in order to press a chip out of contact with the cutting insert as soon as possible after the separation of the chip from the workpiece.

In the example, the cutting insert has a neutral or negative geometry, in that all part surfaces included in the side surface 9 extend perpendicularly to the top and bottom sides 7, 8. However, the cutting insert could as well have a positive cutting geometry, i.e., be formed with a side surface that extends at an acute angle to the top side. In this connection, it should also be mentioned that the cutting insert may be double sided, i.e., be formed with a chip-breaking cutting geometry also on the bottom side 8 thereof.

As far as the shown cutting insert has been described hitherto, the same is in all essentials previously known.

Reference is now made to FIGS. 3-7, which on an enlarged scale illustrate the novelty of the invention.

Figure 3:
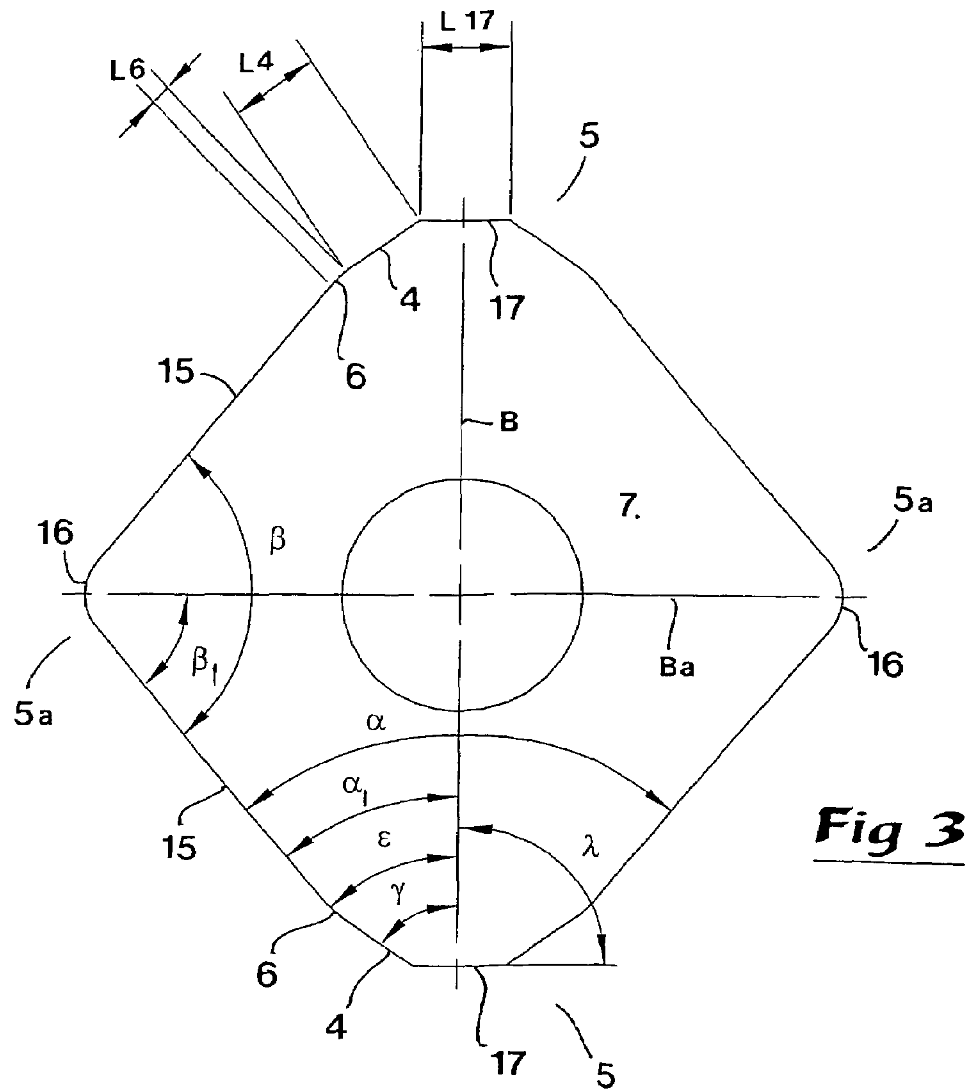
FIG. 3 is a planar view of the cutting insert illustrating various geometrical data of the same.
Figure 4:
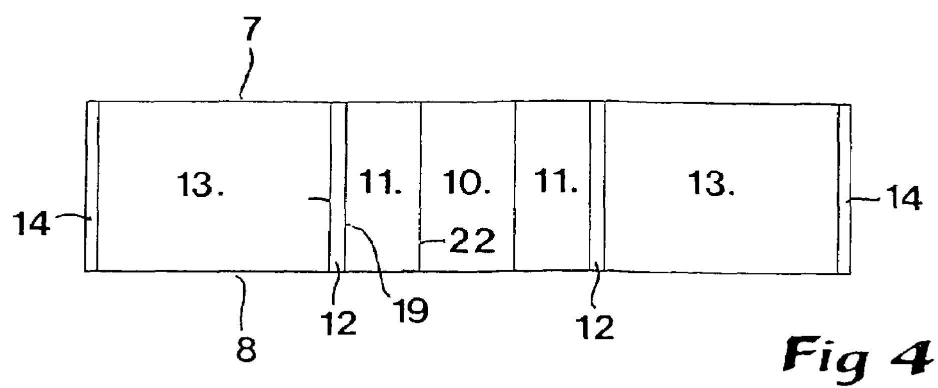
FIG. 4 is an end view of the cutting insert according to FIG. 3.

In FIG. 3, B designates a diagonal line between the corners 5, which forms a bisector of the pair of major cutting edges 4. A second bisector Ba extends between the two other, mutually diametrically opposed corners **5*a* of the cutting insert. In addition to the major cutting edge 4 and the surface finishing edge 6, four clearance edges 15 formed adjacent to the part surfaces 13 are included in the cutting insert, which clearance edges extend along the major part of each side of the cutting insert, more precisely from the individual edge 6 to an arched edge 16 adjacent to the convexly curved corner edge surface 14. Furthermore, in connection with the part surface 10, an end edge 17 is present, which extends between nearby major cutting edges 4 at each one of the corners 5 (see also FIG. 2**).

The angle $\alpha$ between the clearance edges 15 adjacent to the individual corner 5 is advantageously acute and amounts in the example shown to be 80°. Accordingly, the angle $\alpha_1$ between the individual clearance edge 15 and the bisector B is 40°. Hence it follows that the angle $\beta$ is obtuse and amounts to 100°, the angle $\beta_1$ between the bisector Ba and the individual clearance edge 15 amounting to 50°. The radius of the corner edges 16 lacks importance.

The angle $\epsilon$ between the individual edge 6 and the bisector B is greater than the angle $\alpha_1$ and amounts to 45° in the example. The angle $\gamma$ between the major cutting edge 4 and the bisector B is even greater and amounts to 55° in the example. The end edge 17 being inactive in normal circumstances may advantageously be straight and extend at a right angle $\lambda$ to the bisector B.

The length L4 of the major cutting edge 4 may vary most considerably depending on the size of the cutting insert, the desired cutting depth, and the amount of material that can be allowed to remain in a fillet. However, in practice, the measure L4 may be within the range of 0.5-2 mm, suitably 0.8-1.5 mm. The edge 6 is considerably shorter though, and may have a length L6 of about 0.3 mm, but that dimension may, however, be varied upwardly or downwardly. The length L17 of the end edge 17 is incidental in functional respect, but may in practice have approximately the same value as the edge length L4.

Figure 5:
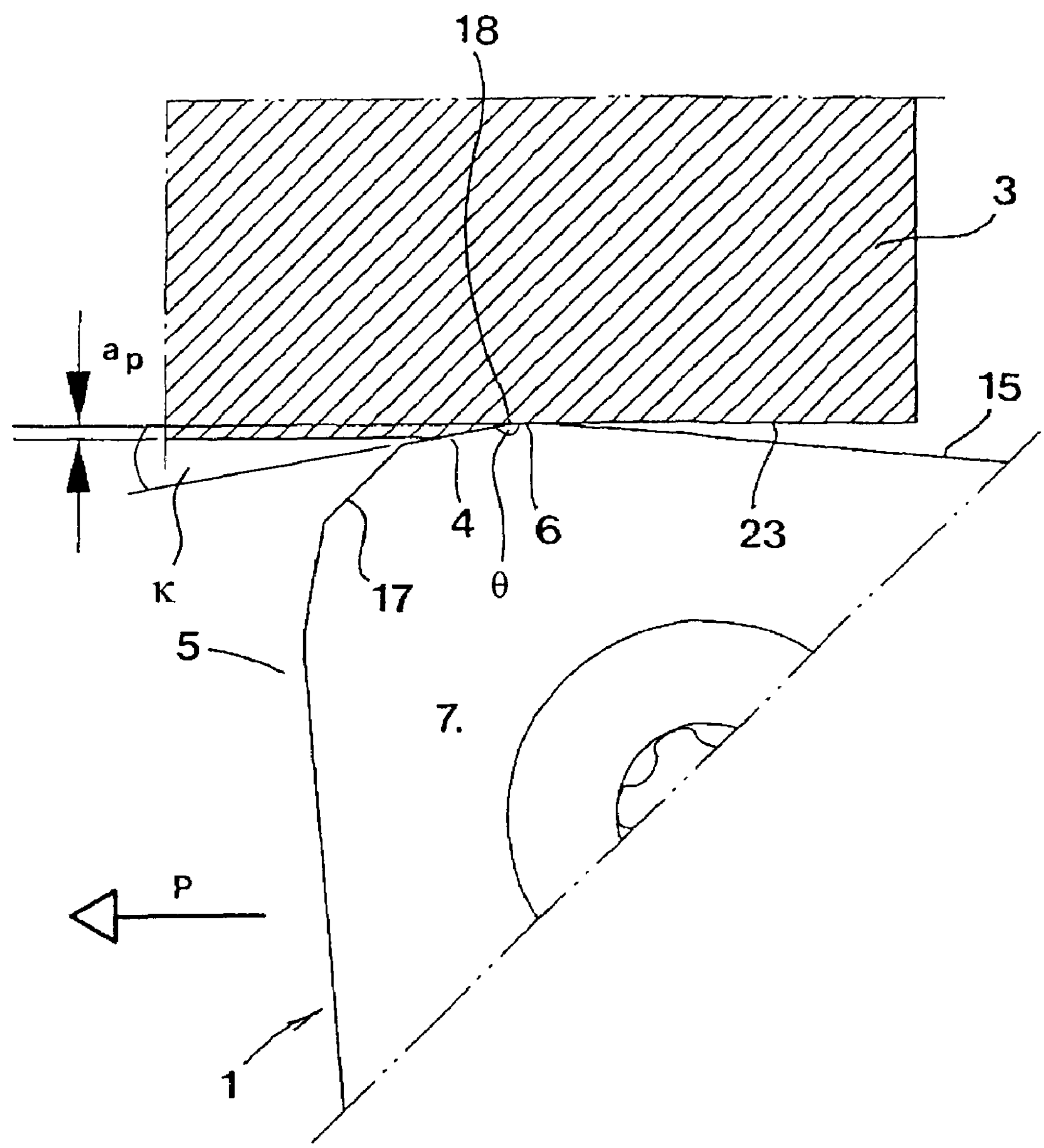
FIG. 5 is an additional enlarged, partial planar view of an active corner portion of the cutting insert during the machining of the workpiece.
Figure 6:
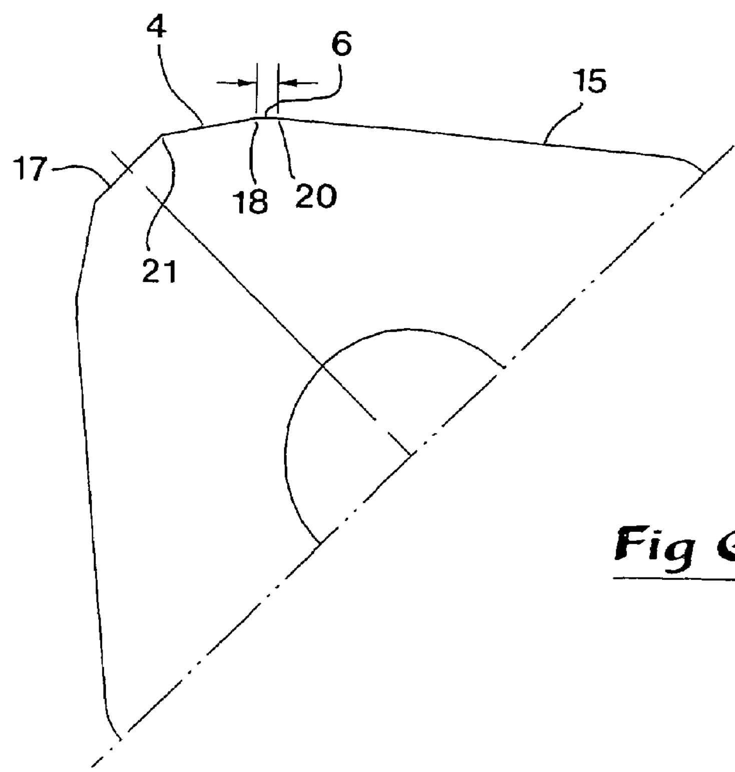
FIGS. 6 and 7 are additional partial planar views of the same corner portion of the cutting insert.
Figure 7:
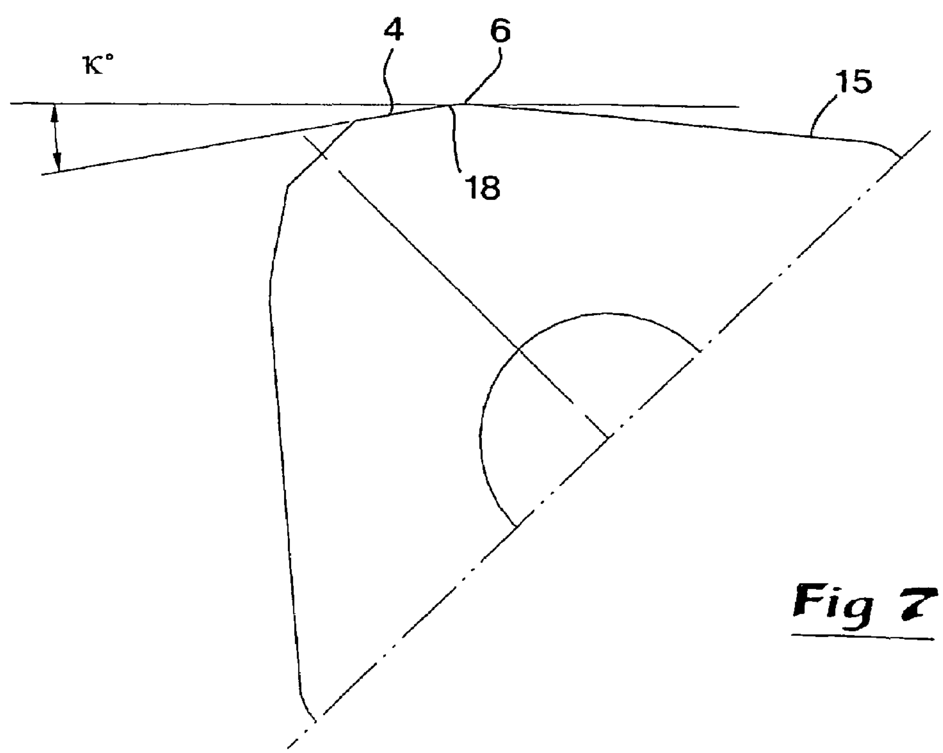

As has been pointed out by way of introduction, the invention is based on the idea of not only making the major cutting edge 4 straight, but above all letting the major cutting edge transform into the surface finishing edge 6 via a sharp transition, which in the enlarged FIGS. 5-7 is designated 18. The concept of "sharp transition" should be interpreted as the absence of any form of deliberately provided arc-shape of the edge at the point where the major cuffing edge 4 transforms into the surface finishing edge 6. If the cutting insert is ground, the sharp transition 18 is provided by the clearance surfaces 11, 12 being ground in planes that extend at an obtuse angle (in the example 170°) to each other, the surfaces transforming into each other via a straight interruption line 19. In other words, the transition 18 is defined by a sharp or prismatic point where the edges 4 and 6 meet the interruption line 19.

As mentioned previously, the surface finishing edge 6, like the major cutting edge 4, may be straight, at least adjacent to the sharp transition 18. Advantageously, the edge 6 is straight along the entire length L6 thereof, after which it transforms into a clearance edge 15 via a transition 20. The shape of this transition 20 is incidental, so that it may be either sharp or softly rounded.

If the manufacture of the insert is effected by a direct pressing procedure (i.e., without grinding), the sharp transition 18 is formed in the same way, i.e., by letting the edges 4, 6 meet at a point that is intersected by an interruption line 19 between the clearance surfaces 11, 12. However, in this case, the transition may get a slight rounding due to the compression-moulding operation. For the transition still to be considered as sharp, possible, unintentional roundness should, however, not have a radius exceeding 0.1 mm. Suitably, the radius of the maximum roundness should not exceed 0.05 mm. Possible transitions having roundnesses below this value, e.g. 0.03 mm, are, however, to be considered as sharp.

In the example, the transition 21 between the end edge 17 and the individual major cutting edge 4 (see FIG. 6) is shown as a sharp transition of the same type as the transition 18. In other words, the transition is provided by the fact that the part surface 10 is planar and transforms into the planar part surface 11 via a straight interruption line 22 (see FIG. 2), which extends through the point of intersection between the edge 4 and the end edge 17. However, in this connection, it should be pointed out that it also is feasible to make the transition 21 as a radial transition.

Reference is now made to FIG. 5, which on a very enlarged scale shows the engagement of the major cutting edge 4 with the workpiece 3. In normal circumstances, in the machining of hard materials, the cutting depth $a_p$ is limited to the range of 0.05-0.3 mm and usually amounts to about 0.15 mm. In the active state according to FIG. 3, the surface-finishing, straight edge 6 is parallel to the feeding direction P (and in the example parallel to the geometrical rotation axis C of the workpiece). Depending on the setting angle κ, along a greater or smaller part of the length thereof adjacent to the transition 18, the major cutting edge 4 will remove chips (not shown) from the workpiece. By virtue of the edge 4 being straight all the way up to the transition 18, the chip will—irrespective of the width in question—be straight and equally thick along the entire width thereof, the chip in its entirety being removed in the direction perpendicular to the edge. This means, in the first place, that the chip removal is carried out under minimal heat release, and in the second place that the chip impinges on the chip-breaking top side of the cutting insert at a point that is optimally distanced from the surface finishing edge 6, which determines the smoothness of the machined envelope surface 23 of the workpiece. In other words, crater wear is counteracted in close vicinity to the surface finishing edge 6, the serviceability of which is guaranteed during a long, effective operating period. In other words, the service life of the cutting insert is extended in comparison with turning inserts that in the critical area between the chip removing edge and the surface finishing edge include rounded edge portions, e.g., of the wiper type.

In practice, the cutting insert according to the invention may be made from a variety of hard materials, such as cubic boron nitride, cemented carbide, ceramics, diamond, etc. However, primarily a manufacture based on cubic boron nitride (CBN) is expected. The cutting insert is particularly suited for the machining of hard materials, such as hardened steel, the turning being effected while applying small cutting depths $a_p$. In connection with such machining, the cutting insert offers a plurality of advantages, such as increased service life (by the reduction of the heat release), optimised chip shape, improved cutting-force directions, and a reduction of the residual stresses in the machined workpiece.

It should be pointed out that the concept of "setting angle" essentially relates to the composed turning tool and the movement thereof in relation to the workpiece, rather than to an individual cutting insert as such. Because the surface finishing, straight edge 6 in the active state is set parallel to the feeding direction (the chip removing edge 4 forming a certain angle to a conceived line in the extension of the wiping edge), the concept of setting angle is, however, to be considered as relevant, in the preceding description as well as in the subsequent claims.

The above-mentioned setting angle κ constitutes the difference between the bisector angle γ of the major cutting edge 4 and the bisector angle ϵ of the surface finishing edge 6. In the example, this difference amounts to 10°. Although 10° constitutes a preferred setting angle, the size of the setting angle may be varied upwardly as well as downwardly. However, the setting angle should not exceed 30° and should advantageously be below 20°. On the other hand, the setting angle should not be below 3°, preferably not below 5°. In practice, the setting angle of the majority of cutting inserts manufactured in accordance with the invention will be within the range of 5-15°, suitably 8-12°.

In this connection, it should be mentioned that the size of the bisector angles $\alpha_1$, $\beta_1$, ϵ and γ may vary most considerably, upwardly as well as downwardly from the values previously exemplified, irrespective of which setting angle κ selected.

It should also be mentioned that, in normal circumstances, only the major cutting edge 4 is active in the removal of the chip. In other words, normally the major cutting edge swallows the entire cutting depth $a_p$. However, the workpiece may have irregularities, which means that also the part of the end edge 17 that connects to the major cutting edge 4 temporarily will participate in the chip removing operation. In other words, also the end edge 17 may instantaneously act as a chip removing edge.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A turning insert, comprising a chip-breaking surface and first and second clearance surfaces located at a corner of the insert; first and second edges being formed at a junction of the chip-breaking surface and the first and second clearance surfaces, respectively, the first edge defining a major cutting edge having a first length and the second edge defining a finishing cutting edge having a second length less than the first length; wherein the major cutting edge is straight and transforms into the second edge at a sharp transition, wherein a setting angle between the first and second edges is no greater than 30 degrees, wherein an additional clearance edge is located adjacent the finishing cutting edge and distal from the major cutting edge, and wherein the additional clearance edge is angled relative to the adjacent finish cutting edge.

2. The turning insert according to claim 1, wherein the second edge is straight.

3. The turning insert according to claim 2, wherein the first and second clearance surfaces are planar and extend at an obtuse angle to one another and intersect along an interruption line which intersects the sharp transition.

4. The turning insert according to claim 1, wherein the first and second clearance surfaces are planar and extend at an obtuse angle to one another to intersect along an interruption line which intersects the sharp transition.

5. The turning insert according to claim 1, wherein the setting angle is at least 3 degrees.

6. A turning insert, comprising a chip-breaking surface and first and second clearance surfaces located at a corner of the insert; first and second edges being formed at a junction of the chip-breaking surface and the first and second clearance surfaces, respectively, the first edge defining a major cutting edge and the second edge defining a finishing cutting edge; wherein the major cutting edge is straight and transforms into the second edge at a sharp transition, and wherein there are two said corners oriented diametrically opposite one another, each corner including a pair of said first and second clearance edges; the corners being bisected by a common bisector; each first edge forming a first angle with the bisector; each second edge forming an acute angle with the bisector; each first angle being larger than the second angle.

7. The turning insert according to claim 6 wherein an end edge extends between the pair of first edges and is at least partially straight.

8. The turning insert according to claim 7 wherein a transition between the end edge and each first edge is sharp.

9. The turning insert according to claim 6 wherein each second edge includes an end remote from the first edge, which end transforms into a clearance edge which is straight and forms with the bisector an angle smaller than an angle formed between each second edge and the bisector.

10. A turning insert, comprising a chip-breaking surface and first and second clearance surfaces located at a corner of the insert; first and second edges being formed at a junction of the chip-breaking surface and the first and second clearance surfaces, respectively, the first edge defining a major cutting edge having a first length and the second edge defining a finishing cutting edge having a second length less than the first length; wherein the major cutting edge is straight and transforms into the second edge at a sharp transition; the second edge being straight; the first and second clearance surfaces being planar and extend at an obtuse angle to one another and intersecting along an interruption line which intersects the sharp transition; a setting angle between the first and second edges being no greater than 30 degrees and at least 3 degrees, wherein an additional clearance edge is located adjacent the finishing cutting edge and distal from the major cutting edge, and wherein the additional clearance edge is angled relative to the adjacent finish cutting edge.

11. A turning insert, comprising a chip-breaking surface and first and second clearance surfaces located at a corner of the insert; first and second edges being formed at a junction of the chip-breaking surface and the first and second clearance surfaces, respectively, the first edge defining a major cutting edge and the second edge defining a finishing cutting edge; wherein the major cutting edge is straight and transforms into the second edge at a sharp transition; the second edges being straight; the first and second clearance surfaces being planar and extending at an obtuse angle to one another and intersecting along an interruption line which intersects the sharp transition; wherein there are two said corners oriented diametrically opposite one another, each corner including a pair of said first and second clearance edges; the corners being bisected by a common bisector; each first edge forming a first angle with the bisector; each second edge forming an acute angle with the bisector; each first angle being larger than the second angle.

12. The turning insert according to claim 11 wherein an end edge extends between the pair of first edges and is at least partially straight.

13. The turning insert according to claim 12 wherein a transition between the end edge and each first edge is sharp.

14. The turning insert according to claim 11 wherein each second edge includes an end remote from the first edge, which end transforms into a clearance edge which is straight and forms with the bisector an angle smaller than an angle formed between each second edge and the bisector.

* * * * *